US012620388B2

(12) United States Patent
Qiu et al.

(10) Patent No.: US 12,620,388 B2
(45) Date of Patent: May 5, 2026

(54) ROBUSTNESS AWARE NORM DECAY FOR QUANTIZATION AWARE TRAINING AND GENERALIZATION

(71) Applicant: Google LLC, Mountain View, CA (US)

(72) Inventors: David Qiu, Fremont, CA (US); David Rim, Mountain View, CA (US); Shaojin Ding, Mountain View, CA (US); Yanzhang He, Mountain View, CA (US)

(73) Assignee: Google LLC, Mountain View, CA (US)

( * ) Notice: Subject to any disclaimer, the term of this patent is extended or adjusted under 35 U.S.C. 154(b) by 189 days.

(21) Appl. No.: 18/632,237

(22) Filed: Apr. 10, 2024

(65) Prior Publication Data
US 2024/0347043 A1       Oct. 17, 2024

Related U.S. Application Data

(60) Provisional application No. 63/495,310, filed on Apr. 11, 2023.

(51) Int. Cl.
*G10L 15/06* (2013.01)

(52) U.S. Cl.
CPC .................................. *G10L 15/063* (2013.01)

(58) Field of Classification Search
CPC .......... G10L 15/063; G10L 15/16; G06N 3/08
USPC ......................................................... 704/243
See application file for complete search history.

(56) References Cited

U.S. PATENT DOCUMENTS

| | | | | |
|---|---|---|---|---|
| 9,275,638 | B2 * | 3/2016 | Meloney | G10L 15/063 |
| 9,865,254 | B1 * | 1/2018 | Filimonov | G10L 15/02 |
| 10,127,905 | B2 * | 11/2018 | Lee | G10L 25/84 |
| 12,007,867 | B1 * | 6/2024 | Park | G06F 11/3428 |
| 12,475,388 | B2 * | 11/2025 | Yu | G06N 3/08 |
| 2010/0318354 | A1 * | 12/2010 | Seltzer | G10L 15/063 |
| | | | | 704/E15.032 |

(Continued)

OTHER PUBLICATIONS

Alexandre D'Efossez et al: "Differentiable Model Compression via Pseudo Quantization Noise", arvix.org, Cornell University Library, 201 Olin Library Cornell University Ithaca, NY 14853, Oct. 17, 2022 (Oct. 17, 2022), XP091344359 (Year: 2022).*

(Continued)

*Primary Examiner* — Thuykhanh Le
(74) *Attorney, Agent, or Firm* — Honigman LLP; Brett A. Krueger; Grant Griffith

(57) ABSTRACT

A method includes obtaining a plurality of training samples, determining a minimum integer fixed-bit width representing a maximum quantization of an automatic speech recognition (ASR) model, and training the ASR model on the plurality of training samples using a quantity of random noise. The ASR model includes a plurality of weights that each include a respective float value. The quantity of random noise is based on the minimum integer fixed-bit value. After training the ASR model, the method also includes selecting a target integer fixed-bit width greater than or equal to the minimum integer fixed-bit width, and for each respective weight of the plurality of weights, quantizing the respective weight from the respective float value to a respective integer associated with a value of the selected target integer fixed-bit width. The operations also include providing the quantized trained ASR model to a user device.

24 Claims, 6 Drawing Sheets

(56) References Cited

U.S. PATENT DOCUMENTS

| | | | | |
|---|---|---|---|---|
| 2014/0257813 A1* | 9/2014 | Mortensen | G10L 15/02 | |
| | | | 704/251 | |
| 2018/0268244 A1* | 9/2018 | Moazzami | G06V 20/176 | |
| 2019/0050710 A1* | 2/2019 | Wang | G06N 3/04 | |
| 2019/0340492 A1* | 11/2019 | Burger | G06N 3/0464 | |
| 2019/0340499 A1* | 11/2019 | Burger | G06N 3/0442 | |
| 2019/0347550 A1* | 11/2019 | Jung | G06N 3/084 | |
| 2020/0160079 A1* | 5/2020 | Reda | G06V 10/454 | |
| 2020/0193270 A1* | 6/2020 | Wu | G06N 3/082 | |
| 2020/0202213 A1* | 6/2020 | Darvish Rouhani | | |
| | | | G06N 3/0442 | |
| 2020/0202218 A1* | 6/2020 | Csefalvay | G06Q 20/3672 | |
| 2020/0211154 A1* | 7/2020 | Ng | A61B 5/1128 | |
| 2020/0272882 A1* | 8/2020 | Lo | G06F 5/012 | |
| 2020/0302289 A1* | 9/2020 | Ren | G06N 3/0464 | |
| 2020/0302298 A1* | 9/2020 | Van Baalen | G06N 3/04 | |
| 2020/0302299 A1* | 9/2020 | Nagel | G06N 3/08 | |
| 2020/0320385 A1* | 10/2020 | Yang | G06N 3/045 | |
| 2020/0364552 A1* | 11/2020 | Guo | G06N 3/09 | |
| 2020/0380357 A1* | 12/2020 | Yao | G06N 3/08 | |
| 2021/0014039 A1* | 1/2021 | Zhang | H04L 9/0618 | |
| 2021/0019076 A1* | 1/2021 | Kim | G06F 3/0679 | |
| 2021/0019616 A1* | 1/2021 | Chen | G06N 3/045 | |
| 2021/0019630 A1* | 1/2021 | Yao | G06N 3/09 | |
| 2021/0065011 A1* | 3/2021 | Liu | G06N 3/084 | |
| 2021/0089906 A1* | 3/2021 | Lazovich | G06N 3/08 | |
| 2021/0110273 A1* | 4/2021 | Kwon | G06N 3/0495 | |
| 2021/0117623 A1* | 4/2021 | Aly | G06F 40/205 | |
| 2021/0141799 A1* | 5/2021 | Steedman Henderson | | |
| | | | G06F 16/24578 | |
| 2021/0209822 A1* | 7/2021 | Yang | G06N 3/09 | |
| 2021/0216902 A1* | 7/2021 | Sutcher-Shepard | G06N 20/00 | |
| 2021/0274496 A1* | 9/2021 | Chen | G06F 16/29 | |
| 2021/0279635 A1* | 9/2021 | Gadelrab | G06N 3/063 | |
| 2021/0370993 A1* | 12/2021 | Qian | G06N 3/0985 | |
| 2022/0044114 A1* | 2/2022 | Sriram | G06N 3/08 | |
| 2022/0058530 A1* | 2/2022 | Lin | G06N 3/0464 | |
| 2022/0083855 A1* | 3/2022 | Choi | G06F 18/22 | |
| 2022/0092382 A1* | 3/2022 | Moshovos | G06N 3/04 | |
| 2022/0101034 A1* | 3/2022 | Ekin | G06V 10/462 | |
| 2022/0114457 A1* | 4/2022 | Schradin, III | G06N 5/04 | |
| 2022/0124433 A1* | 4/2022 | Kupryjanow | G06N 3/09 | |
| 2022/0245444 A1* | 8/2022 | Golub | G06N 3/084 | |
| 2022/0335293 A1* | 10/2022 | Choi | G06N 3/063 | |
| 2022/0398430 A1* | 12/2022 | Boo | G06N 3/08 | |
| 2023/0004816 A1* | 1/2023 | Lee | G06N 3/044 | |
| 2023/0042397 A1* | 2/2023 | Yu | G06N 3/0464 | |
| 2023/0068381 A1* | 3/2023 | Gollanapalli | G06N 3/045 | |
| 2023/0143985 A1* | 5/2023 | Han | G06N 3/063 | |
| | | | 706/16 | |
| 2023/0222334 A1* | 7/2023 | Clement | G06F 18/211 | |
| | | | 706/15 | |
| 2023/0281423 A1* | 9/2023 | Bijalwan | G06N 3/0495 | |
| | | | 382/156 | |
| 2023/0298569 A1* | 9/2023 | Ding | G06N 3/08 | |
| | | | 704/243 | |
| 2023/0351207 A1* | 11/2023 | Yan | G06N 3/098 | |
| 2023/0360065 A1* | 11/2023 | Huang | G06N 5/022 | |
| 2023/0360358 A1* | 11/2023 | Zhao | G06V 10/40 | |
| 2023/0368227 A1* | 11/2023 | Chien | G06Q 10/1053 | |
| 2023/0401834 A1* | 12/2023 | Liang | G06V 10/40 | |
| 2024/0028887 A1* | 1/2024 | Tenace | G06N 3/0464 | |
| 2024/0046426 A1* | 2/2024 | Jung | G06T 5/70 | |
| 2024/0070266 A1* | 2/2024 | Chai | G06F 21/14 | |
| 2024/0080788 A1* | 3/2024 | Wang | G06N 3/098 | |
| 2024/0129577 A1* | 4/2024 | Umakanth | G06N 20/00 | |
| 2024/0135153 A1* | 4/2024 | Csefalvay | G06N 3/048 | |
| 2024/0135174 A1* | 4/2024 | Zhou | G06N 3/04 | |
| 2024/0160406 A1* | 5/2024 | Venkatesan | G06F 7/4876 | |
| 2024/0160898 A1* | 5/2024 | Lee | G06N 3/0495 | |
| 2024/0185046 A1* | 6/2024 | Li | G06N 3/08 | |
| 2024/0185086 A1* | 6/2024 | Hou | G06N 3/096 | |
| 2024/0185498 A1* | 6/2024 | Francis | G06T 15/00 | |
| 2024/0202501 A1* | 6/2024 | Zan | G06N 3/063 | |
| 2024/0205563 A1* | 6/2024 | Beerel | H04N 25/766 | |
| 2024/0212673 A1* | 6/2024 | Zheng | G10L 15/16 | |
| 2024/0220782 A1* | 7/2024 | Jiang | G06N 3/0455 | |
| 2024/0233511 A1* | 7/2024 | Golbon Haghighi | | |
| | | | B60R 21/01534 | |
| 2024/0256842 A1* | 8/2024 | Ashfaq | G06N 3/063 | |
| 2024/0257800 A1* | 8/2024 | Michieli | G06N 3/0495 | |
| 2024/0273399 A1* | 8/2024 | Yang | G06N 3/082 | |
| 2024/0303505 A1* | 9/2024 | Ko | G06N 3/098 | |
| 2024/0386704 A1* | 11/2024 | Zhang | G06V 10/454 | |
| 2025/0045573 A1* | 2/2025 | Yao | G06N 3/0464 | |
| 2025/0086459 A1* | 3/2025 | Hu | G06N 3/08 | |
| 2025/0200348 A1* | 6/2025 | Lin | G06N 3/082 | |
| 2025/0209274 A1* | 6/2025 | Yang | G06F 18/2131 | |

OTHER PUBLICATIONS

International Search Report and Written Opinion issued in related PCT Application No. PCT/US2024/023948, dated Jun. 6, 2024.

Alexandre D'Efossez et al: "Differentiable Model Compression via Pseudo Quantization Noise", arvix.org, Cornell University Library, 201 Olin Library Cornell University Ithaca, NY 14853, Oct. 17, 2022 (Oct. 17, 2022), XP091344359.

Andrea Fasoli et al: "4-bit Quantization of LSTM-based Speech Recognition Models", arvix.org, Cornell University Library, 201 Olin Library Cornell University Ithaca, NY 14853, Aug. 27, 2021 (Aug. 27, 2021), XP091040290.

Kai Zhen et al: "Sub-8-Bit Quantization Aware Training for 8-Bit Neural Network Accelerator with On-Device Speech Recognition", arvix.org, Cornell University Library, 201 Olin Library Cornell Univeristy Ithaca, NY 14853, Jun. 30, 2022 (Jun. 30, 2022), XP091260260.

* cited by examiner $$P(\hat{y}_i | \mathbf{x}_1, \cdots, \mathbf{x}_{t_i}, y_0, \ldots, y_{u_i-1})$$

Softmax 240

$$\mathbf{z}_i$$

Joint Network 230

$$\mathbf{p}_{u_i} \qquad\qquad \mathbf{h}_{t_i}^{enc}$$

Prediction Network 300       Encoder 210

$$y_{u_i-1} \quad 301 \qquad\qquad \mathbf{x}_{t_i}$$

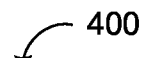
400

OBTAINING A PLURALITY OF TRAINING SAMPLES, EACH RESPECTIVE TRAINING SAMPLE OF THE PLURALITY OF TRAINING SAMPLES THAT INCLUDES A RESPECTIVE SPEECH UTTERANCE AND A RESPECTIVE TEXTUAL UTTERANCE REPRESENTING A TRANSCRIPTION OF THE RESPECTIVE SPEECH UTTERANCE
402

DETERMINING A MINIMUM INTEGER FIXED-BIT WIDTH REPRESENTING A MAXIMUM QUANTIZATION OF AN AUTOMATIC SPEECH (ASR) RECOGNITION MODEL, THE ASR MODEL INCLUDING A PLURALITY OF WEIGHTS, EACH RESPECTIVE WEIGHT OF THE PLURALITY OF WEIGHTS INCLUDING A RESPECTIVE FLOAT VALUE      404

TRAINING THE ASR MODEL ON THE PLURALITY OF TRAINING SAMPLES USING A QUANTITY OF RANDOM NOISE, THE QUANTITY OF RANDOM NOISE BASED ON THE MINIMUM INTEGER FIXED-BIT WIDTH
406

AFTER TRAINING THE ASR MODEL, SELECTING A TARGET INTEGER TARGET FIXED-BIT WIDTH GREATER THAN OR EQUAL TO THE MINIMUM INTEGER FIXED-BIT WIDTH
408

FOR EACH RESPECTIVE WEIGHT OF THE PLURALITY OF WEIGHTS, QUANTIZING THE RESPECTIVE WEIGHT FROM THE RESPECTIVE FLOAT VALUE TO A RESPECTIVE INTEGER ASSOCIATED WITH A VALUE OF THE SELECTED TARGET FIXED-BIT WIDTH      410

PROVIDING THE QUANTIZED TRAINED ASR MODEL TO A USER DEVICE
412

FIG. 4

ROBUSTNESS AWARE NORM DECAY FOR QUANTIZATION AWARE TRAINING AND GENERALIZATION

CROSS-REFERENCE TO RELATED APPLICATIONS

This U.S. patent application claims priority under 35 U.S.C. § 119(e) to U.S. Provisional Application 63/495,310, filed on Apr. 11, 2023. The disclosure of this prior application is considered part of the disclosure of this application and is hereby incorporated by reference in its entirety.

TECHNICAL FIELD

This disclosure relates to robustness aware norm decay for quantization aware training and generalization.

BACKGROUND

Modern automated speech recognition (ASR) systems focus on providing not only high quality (e.g., a low word error rate (WER)), but also low latency (e.g., a short delay between the user speaking and a transcription appearing). Moreover, when using an ASR system today there is a demand that the ASR system decode utterances in a streaming fashion that corresponds to real-time or even faster than real-time. To illustrate, when an ASR system is deployed on a mobile phone that experiences direct user interactivity, an application on the mobile phone using the ASR system may require the speech recognition to be streaming such that words appear on the screen as soon as they are spoken. Here, it is also likely that the user of the mobile phone has a low tolerance for latency. Due to this low tolerance, the speech recognition strives to run on the mobile device in a manner that minimizes an impact from latency and inaccuracy that may detrimentally affect the user's experience. However, mobile phones often have limited resources, which limit the size of the ASR model.

SUMMARY

One aspect of the disclosure provides a computer-implemented method that when executed on data processing hardware causes the data processing hardware to perform operations that include obtaining a plurality of training samples, determining a minimum integer fixed-bit width representing a maximum quantization of an automatic speech recognition (ASR) model, and training the ASR model on the plurality of training samples using a quantity of random noise. Each respective training sample of the plurality of training samples includes a respective speech utterance and a respective textual utterance representing a transcription of the respective speech utterance. The ASR model includes a plurality of weights, wherein each respective weight of the plurality of weights includes a respective float value. The quantity of random noise used for training the ASR model is based on the minimum integer fixed-bit value. After training the ASR model, the operations also include selecting a target integer fixed-bit width greater than or equal to the minimum integer fixed-bit width, and for each respective weight of the plurality of weights, quantizing the respective weight from the respective float value to a respective integer with the selected target integer fixed-bit width. The operations also include providing the quantized trained ASR model to a user device.

Implementations of the disclosure may include one or more of the following optional features. In some implementations, training the ASR model using the quantity of random noise includes, for each respective channel of each respective tensor of the ASR model, determining a respective maximum value for the respective channel of the respective tensor, and adding, to the respective channel of the respective tensor, a uniform distribution of noise based on the respective maximum value and the minimum integer fixed-bit width. In these implementations, the uniform distribution of noise may represent the entire range of noise the ASR model receives due to quantization up to the minimum integer fixed-bit width. Additionally, adding the uniform distribution of noise may include scaling the uniform distribution of noise based on the respective maximum value, while scaling the uniform distribution of noise may be further based on a sensitivity of the respective channel to scaling.

In some examples, the maximum quantization level includes a 4-bit quantization. In other examples, the maximum quantization level includes a 2-bit quantization. The random noise may be drawn from a uniform distribution of noise.

In some additional implementations, training the ASR model using the quantity of random noise includes adding, during forward propagation of the ASR model, the quantity of random noise. The ASR model may further include a plurality of activations each associated with a respective float value such that for each respective action of the plurality of activations, the operations further include quantizing the respective activation from the respective float value to the respective integer with the selected target fixed-bit width.

Another aspect of the disclosure provides a system that includes data processing hardware and memory hardware storing instructions that when executed on the data processing hardware causes the data processing hardware to perform operations that include obtaining a plurality of training samples, determining a minimum integer fixed-bit width representing a maximum quantization of an automatic speech recognition (ASR) model, and training the ASR model on the plurality of training samples using a quantity of random noise. Each respective training sample of the plurality of training samples includes a respective speech utterance and a respective textual utterance representing a transcription of the respective speech utterance. The ASR model includes a plurality of weights, wherein each respective weight of the plurality of weights includes a respective float value. The quantity of random noise used for training the ASR model is based on the minimum integer fixed-bit value. After training the ASR model, the operations also include selecting a target integer fixed-bit width greater than or equal to the minimum integer fixed-bit width, and for each respective weight of the plurality of weights, quantizing the respective weight from the respective float value to a respective integer with the selected target integer fixed-bit width. The operations also include providing the quantized trained ASR model to a user device This aspect of the disclosure may include one or more of the following optional features. In some implementations, training the ASR model using the quantity of random noise includes, for each respective channel of each respective tensor of the ASR model, determining a respective maximum value for the respective channel of the respective tensor, and adding, to the respective channel of the respective tensor, a uniform distribution of noise based on the respective maximum value and the minimum integer fixed-bit width. In these implementations, the uniform distribution of noise may represent the entire range of noise the ASR model receives due to quantization up to the minimum integer fixed-bit width. Additionally, adding the uniform distribution of noise may include scaling the uniform distribution of noise based on the respective maximum value, while scaling the uniform distribution of noise may be further based on a sensitivity of the respective channel to scaling.

In some examples, the maximum quantization level includes a 4-bit quantization. In other examples, the maximum quantization level includes a 2-bit quantization. The random noise may be drawn from a uniform distribution of noise.

In some additional implementations, training the ASR model using the quantity of random noise includes adding, during forward propagation of the ASR model, the quantity of random noise. The ASR model may further include a plurality of activations each associated with a respective float value such that for each respective action of the plurality of activations, the operations further include quantizing the respective activation from the respective float value to the respective integer with the selected target fixed-bit width Another aspect of the present disclosure provides a computer-implemented method that when executed on data processing hardware causes the data processing hardware to perform operations that include obtaining a plurality of training samples, determining a minimum integer fixed-bit width representing a maximum quantization of a model, and training the model on the plurality of training samples using a quantity of random noise. The model includes a plurality of weights, wherein each respective weight of the plurality of weights includes a respective float value. The quantity of random noise used for training the model is based on the minimum integer fixed-bit value. After training the model, the operations also include selecting a target integer fixed-bit width greater than or equal to the minimum integer fixed-bit width, and for each respective weight of the plurality of weights, quantizing the respective weight from the respective float value to a respective integer with the selected target integer fixed-bit width. The operations also include providing the quantized trained ASR model to a user device.

This aspect of the disclosure may include one or more of the following optional features. In some implementations, the model includes an automated speech recognition (ASR) model. In other implementations, the model includes a large language model. In yet other implementations, the model includes an image processing model.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is a flowchart of an example arrangement of operations for a method of training an automatic speech recognition (ASR) model.

Like reference symbols in the various drawings indicate like elements.

DETAILED DESCRIPTION

Figure 1A:
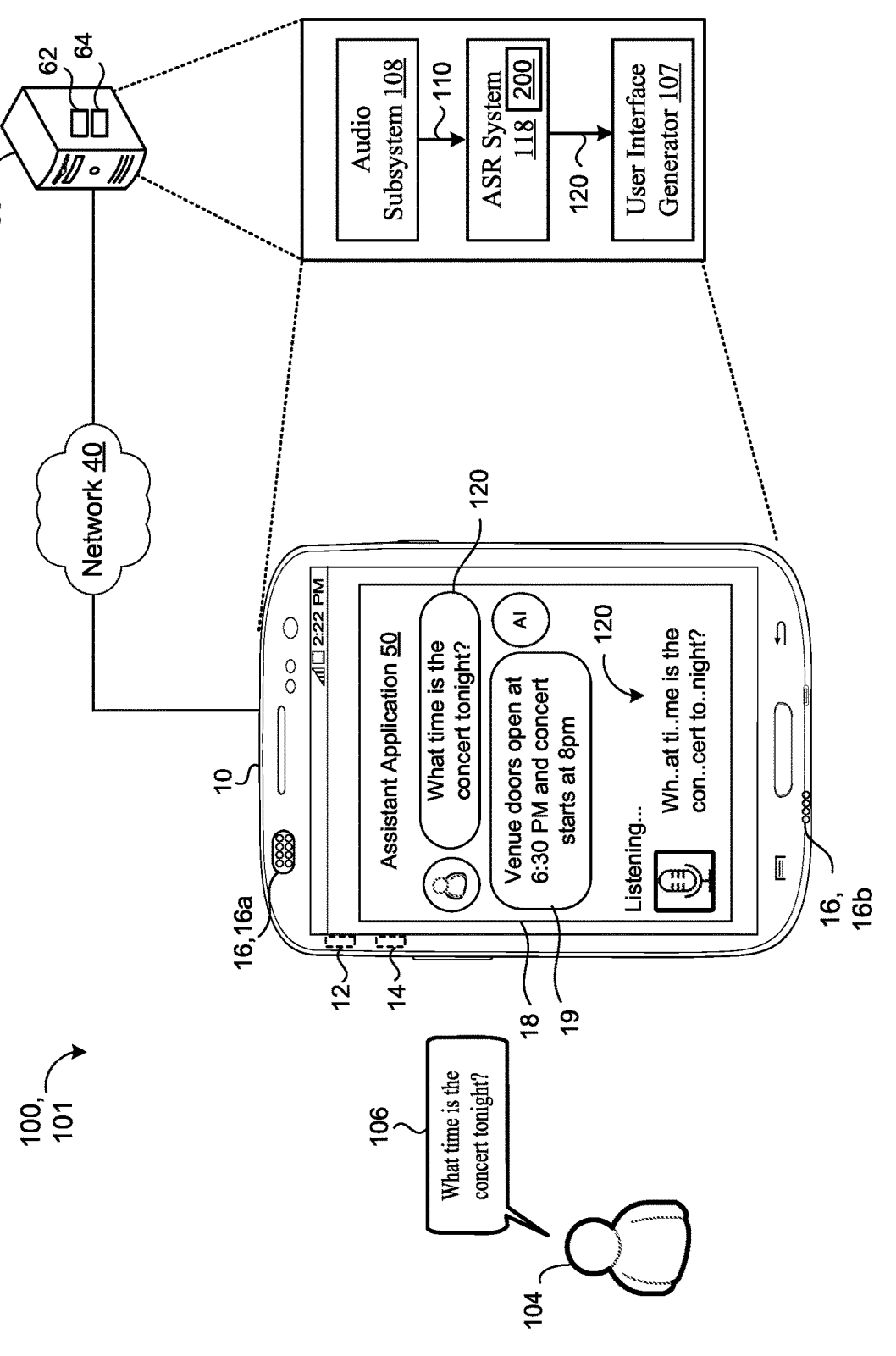
FIG. 1A is a schematic view of an example system for performing speech recognition.

With the fast growth of voice search and speech-interactive features, automatic speech recognition (ASR) has become an essential component for user-interactive services and devices (e.g., search by voice functions in search engines and smartphones). Modern ASR applications are often developed based on an end-to-end model, which has been shown to achieve significant recognition performance improvements compared to conventional hybrid systems with a much smaller model size. Improving latency and model size without compromising recognition quality has been an active pursuit to benefit live ASR applications with both server-side and on-device models.

Quantization is a technique to reduce the computational and memory costs of ASR models by representing the weights and/or activations with lower precision data types (e.g., an 8-bit integer) instead of a conventional 32-bit floating point value. Among modern model quantization methods, post training quantization (PTQ) with 8-bit integers (int8) is a popular and easy to use technique that has been successfully applied in many applications. However, one of the drawbacks of such a technique is the potential performance degradation due to the loss of precision. Moreover, PTQ, during training, generally does not expose the model to noise the model experiences after training, which causes accuracy to further suffer.

Quantization aware training (QAT) is an alternative technique to PTQ that emulates quantization during the forward pass in training, which allows the network to learn from the quantization. That is, the quantization emulation introduces error to the model which the model attempts to compensate for by adjusting parameters (i.e., weights). Thus, QAT tends to reduce loss versus conventional PTQ methods. However, conventional QAT relies on the user committing to the amount of quantization during training. That is, conventional QAT requires the user to select what weights and/or activations will be quantized and to what extent (e.g., 8-bit, 4-bit, etc.) during training. The resulting trained model will generally lose accuracy whenever quantized in a manner different from what was emulated during training. For example, a model trained using QAT for 8-bit quantization will be less accurate at 4-bit quantization than a model trained using 4-bit quantization. The reverse is also true in that a model trained using QAT for 4-bit quantization will be less accurate at 8-bit quantization than a model trained using 8-bit quantization. Put another way, the model tends to be tuned to the particular use case dictated during training. This requires training separate models for each potential quantization use case. Because very large and complex models (such as large language models (LLMs)) take considerable resources to train and store, the training of models individually is not ideal.

Implementations herein are directed toward a model trainer that trains an ASR model (or a large language model (LLM) or image processing model) using robustness aware norm decay for QAT. The model trainer trains the ASR model to be robust to quantization with a per channel scale by adding an expected noise distribution during training. For example, the model trainer determines a worst-case amount of noise the ASR model is subject to from quantization. The model trainer adds a uniform distribution of noise to the ASR model during training based on the worst-case amount of noise. The model trainer improves the robustness of learned weights to deployment time perturbation by pushing the converged set of weights toward a flat minimum, which lowers the loss increase after rounding. The model trainer also makes the converged set of weights closer to the quantization centroid to decrease rounding noise. Additionally, the model trainer trains the ASR model to be both robust at lower precisions and higher precisions compared to conventional models. In some implementations, the model trainer lowers the quantization scale parameter (i.e., the matrix norm of the weight matrix) in order to ensure the rounding noise is less scaled. While specific examples depict the training and quantization of an ASR model, the techniques disclosed herein are equally applicable to training and quantizing other types of models, such as, without limitation, large language models (LLMs) and image processing models.

FIG. 1A is an example of a system 100 operating in a speech environment 101. In the speech environment 101, a user's 104 manner of interacting with a computing device, such as a user device 10, may be through voice input. The user device 10 (also referred to generally as a device 10) is configured to capture sounds (e.g., streaming audio data) from one or more users 104 within the speech environment 101. Here, the streaming audio data may refer to a spoken utterance 106 by the user 104 that functions as an audible query, a command for the device 10, or an audible communication captured by the device 10. Speech-enabled systems of the device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 101 into electrical signals and a speech output device (e.g., a speaker) 16, 16b for communicating an audible audio signal (e.g., as output audio data from the device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

In the speech environment 101, an automated speech recognition (ASR) system 118 includes a model 200 (such as a recurrent neural network-transducer (RNN-T) model or other conformer transducer model/multi-pass model) that resides on the user device 10 of the user 104 and/or on a remote computing device 60 (e.g., one or more remote servers of a distributed system executing in a cloud-computing environment) in communication with the user device 10 via a network 40. The remote computing device is equipped with data processing hardware 62 and memory hardware 64. The user device 10 and/or the remote computing device 60 also includes an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., acoustic frames) 110 for input to the ASR system 118. Thereafter, the model 200 receives, as input, the audio frames 110 (i.e., audio data) corresponding to the utterance 106, and generates/predicts, as output, a corresponding transcription 120 (e.g., speech recognition result/hypothesis) of the utterance 106.

The user device 10 and/or the remote computing device 60 also executes a user interface generator 107 configured to present a representation of the transcription 120 of the utterance 106 to the user 104 of the user device 10. As described in greater detail below, the user interface generator 107 may display the speech recognition results 120 in a streaming fashion. In some configurations, the transcription 120 output from the ASR system 118 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription into synthesized speech for audible output by the user device 10 and/or another device.

In the example shown, the user 104 interacts with a program or application 50 (e.g., the digital assistant application 50) of the user device 10 that uses the ASR system 118. For instance, FIG. 1A depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16a and processed by audio systems 16 of the user device 10. In this example, the audio system 16 receives the spoken utterance 106 and converts it into acoustic frames 110 for input to the ASR system 118.

Figure 1B:
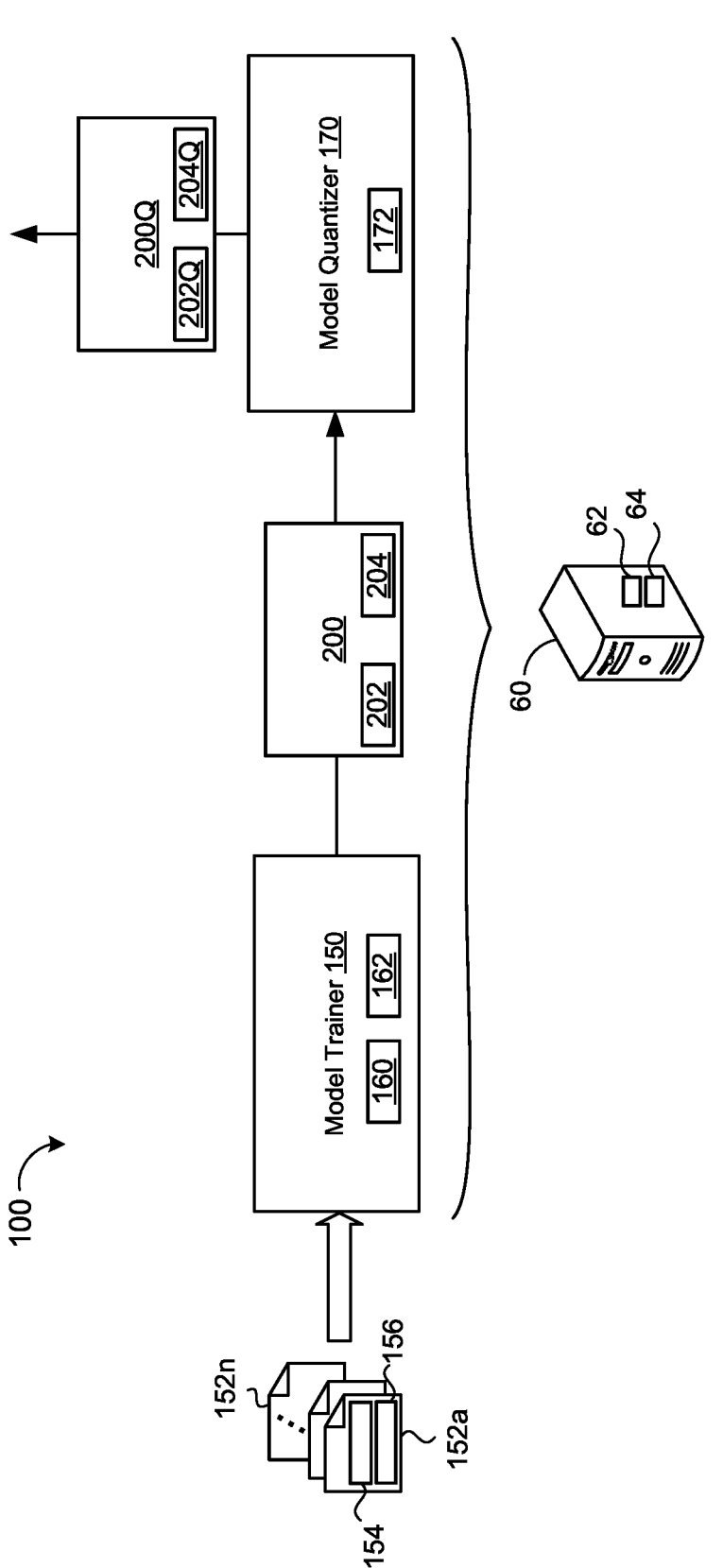
FIG. 1B is a schematic view of components for training an automatic speech recognition (ASR) model for the system of FIG. 1A.

Referring now to FIG. 1B, the remote computing device 60 executes a model trainer 150 to train the model 200 of FIG. 1A. The model trainer 150 obtains a plurality of training samples 152, 152a-n (e.g., from the memory hardware 64). Each training sample 152 includes a spoken training utterance 154 (i.e., a sequence of input audio features) paired with a corresponding textual utterance 156 representing a transcription 156 of the utterance 154. The model trainer 150 determines a minimum integer fixed-bit width 160. The minimum integer fixed-bit width 160 represents a maximum quantization of an ASR model 200. That is, the minimum integer fixed-bit width 160 represents the smallest integer bit-width that the model 200 may be quantized to. In some examples, the minimum integer fixed-bit width 160 is 4-bit. In other examples, the minimum integer fixed-bit width 160 is 2-bit. Any other bit width is possible.

The model trainer 150 trains the ASR model 200 on the plurality of training samples 152. The ASR model 200 includes weights 202 and activations 204. In some examples, the weights 202 and/or activations 204 are 32-bit float values. In other examples, the weights 202 and/or activations 204 are other float values. As discussed in more detail below, the model trainer 150 uses quantization aware training to adjust the weights 202 and/or activations 204 of the ASR model 200 by adding a quantity of random noise 162 to the weights 202 and/or the activations 204 during training.

After training the ASR model 200, a model quantizer 170 selects a target integer fixed-bit width 172 for the ASR model 200. The target integer fixed-bit width 172 may be any value greater than or equal to the minimum integer fixed-bit width 160. For example, when the minimum integer fixed-bit width 160 is 4-bit, the target integer fixed-bit width 172 may be 4-bit, 8-bit, 16-bit, 32-bit, etc. The target integer fixed-bit width 172 may be pre-determined for the use case of the ASR model 200 or based on the user device 10 (or whatever computing the device the ASR model 200 is to execute on). For example, the target integer fixed-bit width 172 may be 4-bit when the computing device (e.g., the user device 10) has minimal computing resources. In another example, the target integer fixed-bit width 172 may be 8-bit when the computing device has more significant computing resources. In some examples, the target integer fixed-bit width 172 is configurable (e.g., by the user 104). The model quantizer 170, for some or all of the weights 202 of the ASR model 200, quantizes the respective weight 202 from the respective float value (e.g., 32-bit float value) to a respective integer with a value of the selected target integer fixed-bit width 172. For example, when the selected target integer fixed-bit width 172 is 4-bit, the model quantizer 170 quantizes the float values of the weights 202 and/or the activations 204 to 4-bit integer values. In some implementations, the remote computing device 60 provides the quantized model 200, 200Q with the quantized weights 202, 202Q and/or the quantized activations 204, 204Q to the user device 10.

Neural networks generally involve tensors that include matrix multiplications. The matrix multiplication of the tensors may be modeled as y=Wx where x is an input column vector, W is a weight matrix, and y is an output column vector. Accordingly, each row may be modeled by $y_i=W_ix$ where i is the row. Each row may be referred to as a channel of the respective tensor. Conventionally, the values of the weight matrix (i.e., W) are 32-bit float values. During quantization, these float values are converted to a corresponding integer value (i.e., a 4-bit integer, an 8-bit integer, etc.). This necessarily involves a loss of precision via rounding. This rounding introduces noise to the weights, and this noise may introduce loss of accuracy during inference. Quantization aware training attempts to make the network aware of this noise by introducing noise comparable to the noise introduced during quantization. For example, during conventional QAT, a model that is to be quantized to 8-bit integers has noise introduced that emulates the noise generated by rounding the float values to 8-bit integers. However, this noise is specific to the specific quantization the model is trained for, making the model sub-optimal for other quantization values.

In contrast, the model trainer 150 introduces the ASR model 200 to noise that allows the model 200 to adapt to noise present for different quantization values simultaneously. In some implementations, the model trainer 150, while training the ASR model 200, randomly draws the noise 162 from a uniform distribution of noise. In some of these implementations, the model trainer 150 determines a respective maximum value for each channel of each tensor of the ASR model 200. For example, the maximum value represents the absolute value of the maximum weight value for the channel. The model trainer 150 adds noise to each respective channel of each respective tensor of the ASR model 200 (e.g., during forward propagation) separately and independently based on the maximum value for the respective channel and the minimum integer fixed-bit width 160. In some implementations, the uniform distribution of noise represents the entire range of noise the ASR model 200 may receive due to quantization up to the minimum integer fixed-bit width 160. Generally speaking, the greater the quantization (i.e., the smaller the integer width the weights 202 and/or activations 204 are rounded to), the greater the noise introduced to the ASR model 200. The uniform distribution of noise may include up to the maximum amount of noise the ASR model 200 may be introduced to based on the minimum integer fixed-bit width 160. For example, when the minimum integer fixed-bit width 160 is 4-bit, the uniform distribution includes noise up to the maximum the ASR model 200 may experience when quantized to 4-bit integers. In some implementations, the model trainer 150 adds noise per the following equation, where y is the output, W is the weight, bit is the minimum integer fixed-bit width 160 (i.e., four for 4-bit quantization, eight for 8-bit quantization, etc.), and N is the added noise.

$$y_i = \left(W_i + \frac{\max(|W_i|)}{2^{bit-1}-1}N_i\right)x,$$

where every entry of $N_i$ is drawn from Unif(−0.5, 0.5)   (1)

By sampling the added noise from such a uniform distribution, the model trainer 150 exposes the ASR model 200 to noise that emulates a range of quantization from the maximum quantization represented by the minimum integer fixed-bit width 160 to no quantization. This allows the ASR model 200 to learn to adapt to each of these different noise scenarios. The model trainer 150 adds this noise on a per channel basis because adding the noise globally (e.g., at the tensor level) would introduce incorrect per noise power, which would degrade performance of the ASR model 200.

In some implementations, the model trainer 150 scales the added noise to attenuate outliers (i.e., general robustness aware norm decay). That is, the model trainer 150 may make the ASR model 200 "scale-aware" so that information from the noise gradient is not discarded during training. For example, the model trainer may instead model max(|W_i|) from the above equation as maybe_stop_grad(|W_i|) to simultaneously induce robustness to noise and provide a gradient to selectively attenuate outliers. That is, in some implementations, the model trainer 150 back propagates to the norm term ||W_i||, which allows the network to learn to lower the scale in a principled way. For example, channels that are more sensitive to scaling may be attenuated more than channels that are relatively less sensitive to scaling. The sensitivity of the channel to scaling represents an amount that scaling affects the output of the channel.

Thus, the model trainer 150 trains the ASR model 200 to be robust to quantization with a per channel scale by adding the expected noise distribution during training. Because the model trainer 150 adds uniform noise, the weights 202 converge to a point where the average loss of the hyper-rectangle around it is minimized. The length of each side of the rectangle depends on the scale for the respective weight 202. The exposure to noise causes the weights 202 to converge toward a flatter minima, while the norm (scale) decay gradients make the hyperrectangle smaller in a prin-cipled way. That is, when the network loss value is plotted against the values of the network weights, minimizing average loss over a hyper rectangle causes the weights to converge to a region with a flat loss surface. Because the scale parameter used to scale the noise is based on the worst case noise that the ASR model 200 is designed for (e.g., 4-bit quantization), the noise also covers the ranges of noise encountered for higher precision, allowing the ASR model 200 to operate effectively at both lower precision and higher precision.

The model trainer 150 may apply the techniques described herein to some or all of the weights 202 of the ASR model 200, some or all of the activations 204 of the ASR model 200, or any combination thereof. The model trainer 150 enables training of a single ASR model 200 that can be effectively quantized to a number of different preci-sions, which greatly improves efficiency of research and evaluation. While examples herein describe an ASR model 200, the model trainer 150 may train any other type of model, such as a large language model (LLM), a vision model, etc.

Additionally, techniques herein may be applied to improve generalization of the ASR model 200. That is, $\|W_i\|$ is a general norm, and during quantization, the model trainer 150 uses an infinity norm. This may be changed to an L1 or an L2 norm to allow the ASR mode 1200 to learn to reduce the L1 or L2 norm of the matrix depending on how that set of weights are affected by perturbations. This is an improve-ment over conventional L1 or L2 regularization, where instead every weight is shifted down depending on magni-tude only. Because the norm of the weight matrix is related to how much amplification any input or weight noise will encounter, the model trainer 150 may be used to improve generalization of extremely large neural network models. The model trainer 150 may decay the matrix norm depend-ing on how sensitive the norm is to noise perturbations as opposed to robustness unaware technique such as L2 regu-larization.

Figure 2:
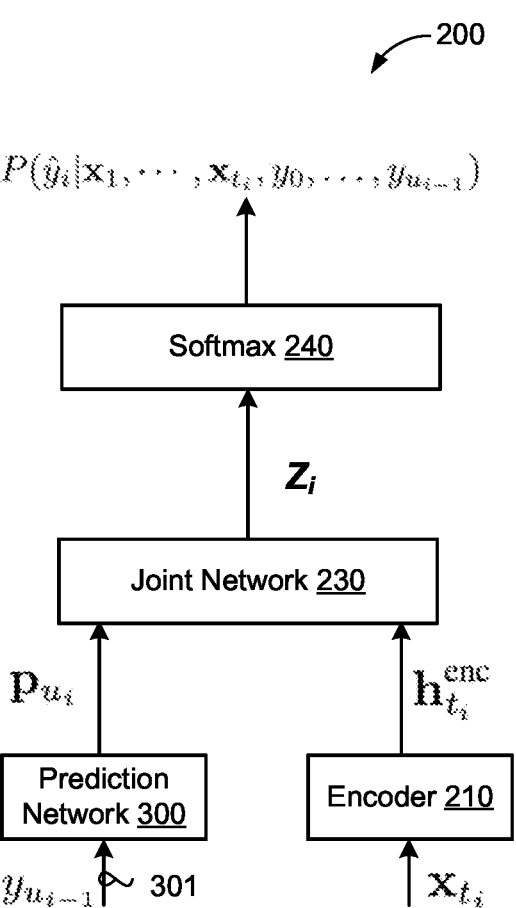
FIG. 2 is a schematic view of an example recurrent neural network-transducer (RNN-T) model for the system of FIG. 1A.

Referring now to FIG. 2, an example model 200 includes a Recurrent Neural Network-Transducer (RNN-T) model architecture which adheres to latency constrains associated with interactive applications. The use of the RNN-T model architecture is exemplary, and the model 200 may include other architectures such as transformer-transducer and con-former-transducer model architectures among others. The RNN-T model 200 provides a small computational footprint and utilizes less memory requirements than conventional ASR architectures, making the RNN-T model architecture suitable for performing speech recognition entirely on the user device 10 (e.g., no communication with a remote server is required). In this example, the RNN-T model 200a includes an encoder network 210, a prediction network 300, and a joint network 230. The encoder network 210, which is roughly analogous to an acoustic model (AM) in a tradi-tional ASR system, includes a stack of self-attention layers (e.g., Conformer or Transformer layers) or a recurrent net-work of stacked Long Short-Term Memory (LSTM) layers. For instance, the encoder reads a sequence of d-dimensional feature vectors (e.g., acoustic frames) $x=(x_1, x_2, \ldots, x_T)$,

10 where $x_1 \in R_d$, and produces at each output step a higher-order feature representation. This higher-order feature rep-resentation is denoted as $$h_1^{enc}, \ldots, h_T^{enc}.$$

Similarly, the prediction network 300 may also be an LSTM network, which, like a language model (LM), pro-cesses the sequence of non-blank symbols output by a final Softmax layer 240 so far, $y_0, \ldots, y_{ui-1}$, into a dense representation put. Finally, with the RNN-T model archi-tecture, the representations produced by the encoder and prediction/decoder networks 210, 300 are combined by the joint network 230. The prediction network 300 may be replaced by an embedding look-up table to improve latency by outputting looked-up sparse embeddings in lieu of pro-cessing dense representations. The joint network then pre-dicts $P(y_i|x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" corre-spond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occur-rence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addi-tion to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the RNN-T model 200 at the corresponding output step. In this manner, the RNN-T model 200 does not make a conditional independence assumption, rather the prediction of each symbol is conditioned not only on the acoustics but also on the sequence of labels output so far. The RNN-T model 200 does assume an output symbol is independent of future acoustic frames 110, which allows the RNN-T model to be employed in a streaming fashion.

In some examples, the encoder network (i.e., audio encoder) 210 of the RNN-T model 200 includes a stack of multi-head attention layers or self-attention layers/blocks, such as one or more conformer blocks/layers or one or more transformer blocks/layers. Optionally, the encoder 210 (i.e., the audio encoder) includes a first pass causal encoder and a second pass non-causal encoder for a multi-pass architecture. This multi-pass model unifies the streaming and non-streaming ASRs, where the causal encoder uses only left context and produces partial results with minimal latency, and the non-causal encoder can provide more accurate hypothesis by using both left and right context. In this example, each conformer block includes a series of multi-headed self attention, depth wise convolution, and feed-forward layers. The prediction network 300 may have two 2,048-dimensional LSTM layers, each of which is also followed by 640-dimensional projection layer. Alternatively, the prediction network 300 may include a stack of trans-former or conformer blocks, or an embedding look-up table in lieu of LSTM layers. Finally, the joint network 230 may also have 640 hidden units. The Softmax layer 240 may be composed of a unified word piece or grapheme set that is generated using all unique word pieces or graphemes in a plurality of training data sets.

Figure 3:
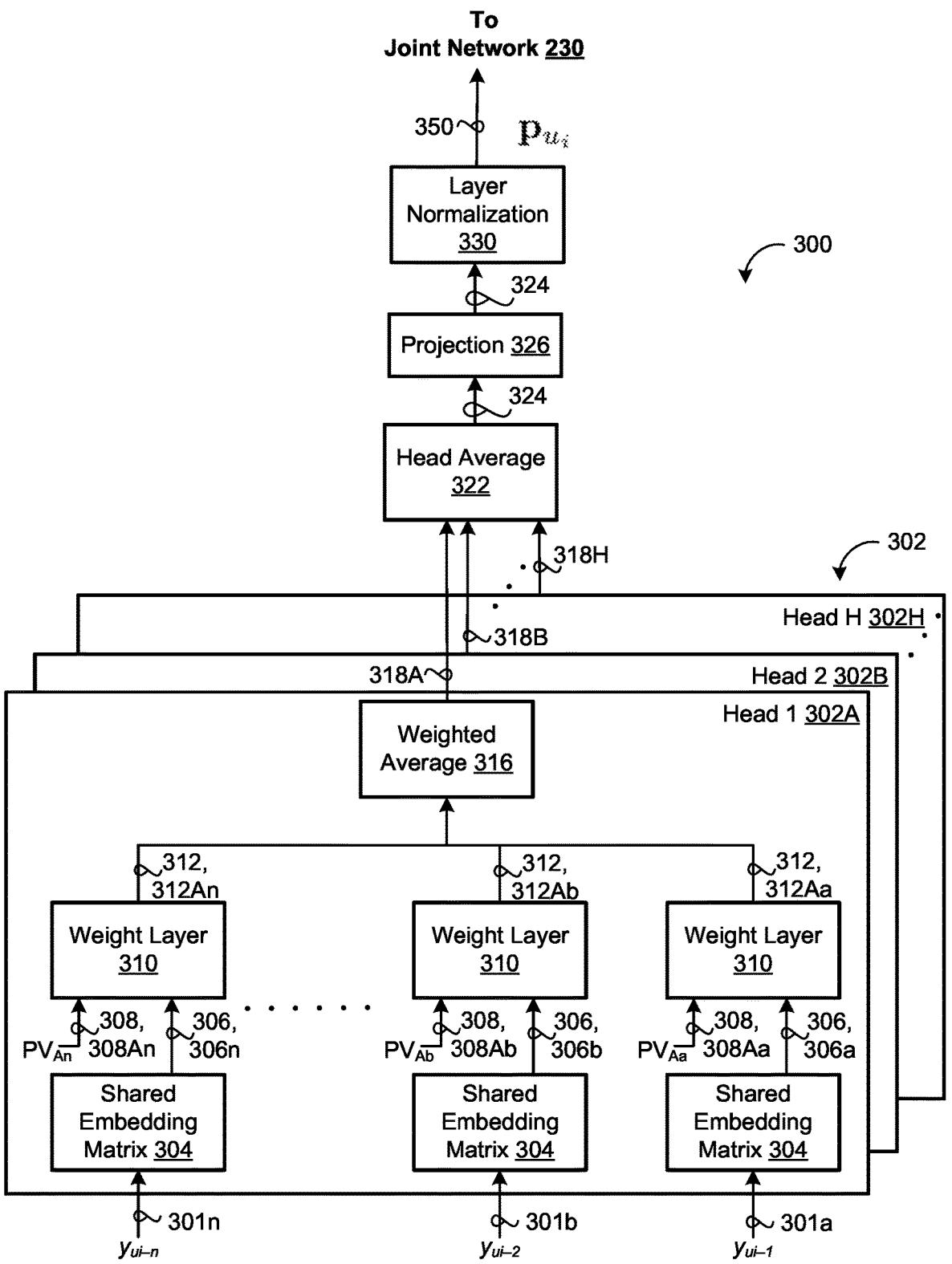
FIG. 3 is a schematic view of an example prediction network of the RNN-T model of FIG. 2.

FIG. 3 illustrates an exemplary prediction network 300 of the RNN-T model 200 receiving, as input, a sequence of non-blank symbols $y_{ui-n}, \ldots, y_{ui-1}$ that is limited to the N previous non-blank symbols 301*a-n* output by the final Softmax layer 240. In some examples, N is equal to two. In other examples, N is equal to five, however, the disclosure is non-limiting and N may equal any integer. The sequence of non-blank symbols 301*a-n* indicates an initial speech recognition result 120*a* (FIG. 1). In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306*a-n* (e.g., $X \in \mathbb{R}^{N \times d_e}$) for each non-blank symbol 301 among the sequence of non-blank symbols $y_{ui-n}, \ldots, y_{ui-1}$ received as input at the corresponding time step from the plurality of time steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., $P \in \mathbb{R}^{H \times N \times d_e}$) to each corresponding non-blank symbol in the sequence of non-blank symbols $y_{ui-n}, \ldots, y_{ui-1}$. The respective position vector PV 308 assigned to each non-blank symbol indicates a position in the history of the sequence of non-blank symbols (e.g., the N previous non-blank symbols output by the final Softmax layer 240). For instance, the first position vector $PV_{Aa}$ is assigned to a most recent position in the history, while the last position vector $PV_{An}$ is assigned to a last position in the history of the N previous non-blank symbols output by the final Softmax layer 240. Notably, each of the embeddings 306 may include a same dimensionality (i.e., dimension size) as each of the position vectors PV 308.

While the corresponding embedding generated by shared embedding matrix 304 for each for each non-blank symbol

301 among the sequence of non-blank symbols 301*a-n*, $y_{ui-n}, \ldots, y_{ui-1}$, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ 308*Ba-Bn*, . . . , and the $H^{th}$ head 302H defines another different row of position vectors $PV_{Ha-Hn}$308*Ha-Hn*.

For each non-blank symbol in the sequence of non-blank symbols 301*a-n* received, the first head 302A also weights, via a weight layer 310, the corresponding embedding 306 proportional to a similarity between the corresponding embedding and the respective position vector PV 308 assigned thereto. In some examples, the similarity may include a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Predication}(X, P) = \frac{1}{H * N} \sum_{h,n} X_n * \sum_e (X_{n,e} * P_{h,n,e}) \qquad (2)$$

In the above equation, h represents the index of the heads 302, n represents position in context, and e represents the embedding dimension. Additionally, H, N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector Pu$_i$ 350 at the corresponding time step from the plurality of time steps. The prediction network 300 generates only a single embedding vector Pu$_i$ 350 at each of the plurality of time steps subsequent to an initial time step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector Pu$_i$ 350.

In some implementations, to further reduce the size of the RNN-T decoder, i.e., the prediction network 300 and the joint network 230, parameter tying between the prediction network 300 and the joint network 230 is applied. Specifically, for a vocabulary size |V| and an embedding dimension d$_e$, the shared embedding matrix 304 at the prediction network is E∈ℝ$^{|V|×d_e}$. Meanwhile, a last hidden layer includes a dimension size d$_h$ at the joint network 230, feed-forward projection weights from the hidden layer to the output logits will be W∈ℝ$^{d_h×|V+1|}$, with an extra blank token in the vocabulary. Accordingly, the feed-forward layer corresponding to the last layer of the joint network 230 includes a weight matrix [d$_h$, |V|]|. By having the prediction network 300 to tie the size of the embedding dimension d$_e$ to the dimensionality d$_h$ of the last hidden layer of the joint network 230, the feed-forward projection weights of the joint network 230 and the shared embedding matrix 304 of the prediction network 300 can share their weights for all non-blank symbols via a simple transpose transformation. Since the two matrices share all their values, the RNN-T decoder only needs to store the values once on memory, instead of storing two individual matrices. By setting the size of the embedding dimension d$_e$ equal to the size of the hidden layer dimension d$_h$, the RNN-T decoder reduces a number of parameters equal to the product of the embedding dimension d$_e$ and the vocabulary size |V|. This weight tying corresponds to a regularization technique.

FIG. 4 is a flowchart of an exemplary arrangement of operations for a computer-implemented method 400 of quantizing a model. The computer-implemented method 400 may execute on the data processing hardware 62 of the remote computing device 60 using instructions stored on the memory hardware 64 of the remote computing device 60. The computer-implemented method 400 includes, at operation 402, includes obtaining a plurality of training samples 152. Each respective training sample 152 of the plurality of training samples 152 includes a respective speech utterance 154 and a respective textual utterance 156 representing a transcription of the respective speech utterance 154. At operation 404, the method 400 includes determining a minimum integer fixed-bit width 160 representing a maximum quantization of an automatic speech (ASR) recognition model 200. The ASR model 200 includes a plurality of weights 202. Each respective weight 202 of the plurality of weights 202 includes a respective float value. The method 400, at operation 406, includes training the ASR model 200 on the plurality of training samples 152 using a quantity of random noise 162. The quantity of random noise 162 is based on the minimum integer fixed-bit width 160. At operation 408, the method 400 includes, after training the ASR model 200, selecting a target integer fixed-bit width 172 that is greater than or equal to the minimum integer fixed-bit width 610. At operation 410, the method 400 includes, for each respective weight 202 of the plurality of weights 202, quantizing the respective weight 202 from the respective float value to a respective integer associated with a value of the selected target integer fixed-bit width 172. The method 400, at operation 412, includes providing the quantized trained ASR model 200Q to a user device 10.

Figure 5:
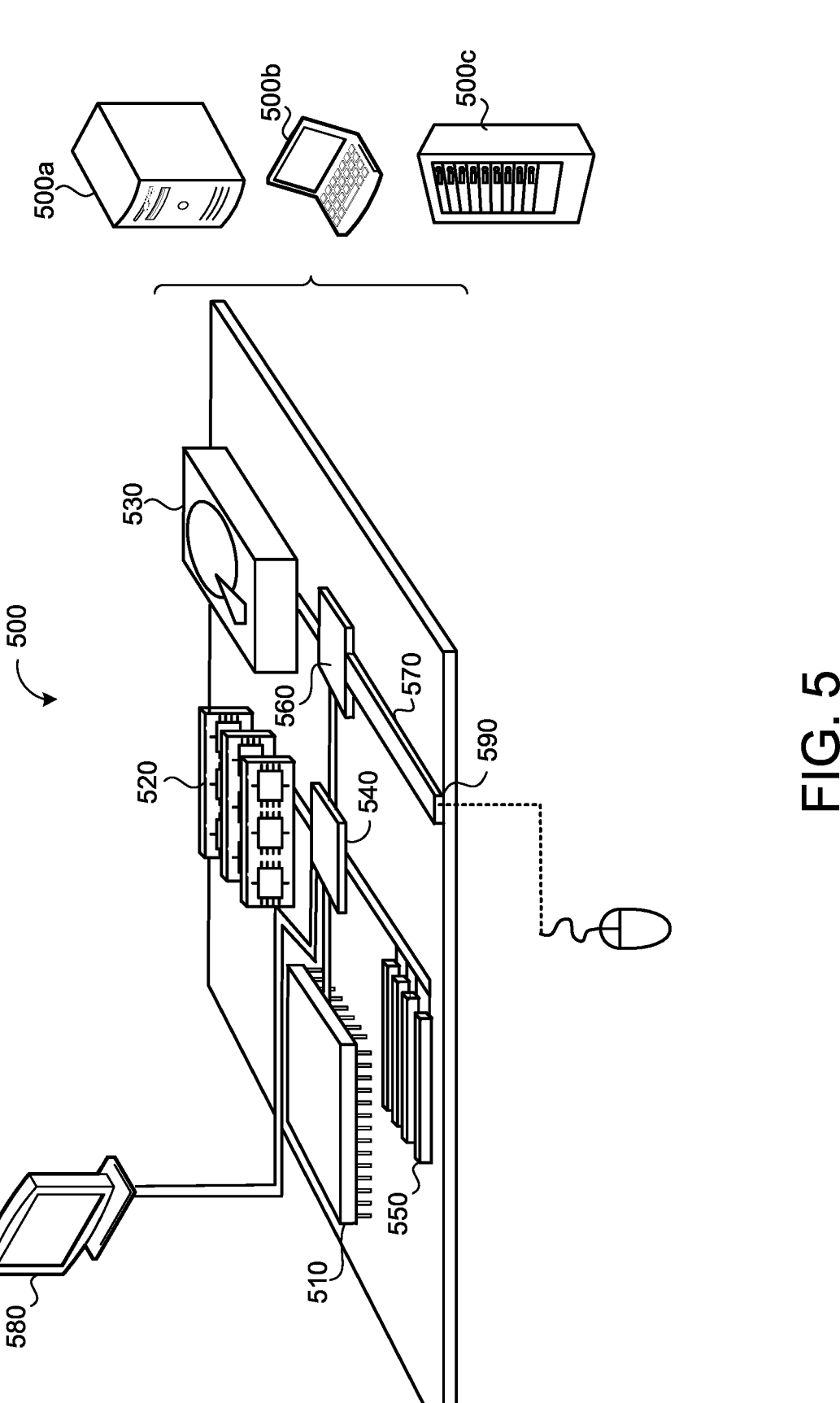
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 (i.e., data processing hardware 62 of the computing device 60 of FIG. 1A) can process instructions for execution within the computing device 500, including instructions stored in the memory 520 (i.e., memory hardware 64 of the computing device 60 of FIG. 1) or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:

obtaining a plurality of training samples, each respective training sample of the plurality of training samples comprising:

a respective speech utterance; and a respective textual utterance representing a transcription of the respective speech utterance;

determining a minimum integer fixed-bit width representing a maximum quantization of an automatic speech recognition (ASR) model, the ASR model comprising a plurality of weights, each respective weight of the plurality of weights comprising a respective float value;

training the ASR model on the plurality of training samples using a quantity of random noise, the quantity of random noise based on the minimum integer fixed-bit width;

after training the ASR model, selecting a target integer fixed-bit width greater than or equal to the minimum integer fixed-bit width;

for each respective weight of the plurality of weights, quantizing the respective weight from the respective float value to a respective integer associated with a value of the selected target integer fixed-bit width; and providing the quantized trained ASR model to a user device.

2. The method of claim 1, wherein the maximum quantization level comprises 4-bit quantization.

3. The method of claim 1, wherein the maximum quantization level comprises 2-bit quantization.

4. The method of claim 1, wherein the random noise is drawn from a uniform distribution of noise.

5. The method of claim 1, wherein training the ASR model using the quantity of random noise comprises, for each respective channel of each respective tensor of the ASR model:

determining a respective maximum value for the respective channel of the respective tensor; and adding, to the respective channel of the respective tensor, a uniform distribution of noise based on the respective maximum value and the minimum integer fixed-bit width.

6. The method of claim 5, wherein the uniform distribution of noise represents the entire range of noise the ASR model receives due to quantization up to the minimum integer fixed-bit width.

7. The method of claim 5, wherein adding the uniform distribution of noise comprises scaling the uniform distribution of noise based on the respective maximum value.

8. The method of claim 7, wherein scaling the uniform distribution of noise is further based on a sensitivity of the respective channel to scaling.

9. The method of claim 1, wherein training the ASR model using the quantity of random noise comprises adding, during forward propagation of the ASR model, the quantity of random noise.

10. The method of claim 1, wherein:

the ASR model further comprises a plurality of activations, each activation of the plurality of activations comprising a respective float value; and for each respective activation of the plurality of activations, the operations further comprise quantizing the respective activation from the respective float value to the respective integer with the value of the selected target fixed-bit width.

11. A system comprising:

data processing hardware; and memory hardware in communication with the data processing hardware, the memory hardware storing instructions that when executed on the data processing hardware cause the data processing hardware to perform operations comprising:

obtaining a plurality of training samples, each respective training sample of the plurality of training samples comprising:

a respective speech utterance; and a respective textual utterance representing a transcription of the respective speech utterance;

determining a minimum integer fixed-bit width representing a maximum quantization of an automatic speech recognition (ASR) model, the ASR model comprising a plurality of weights, each respective weight of the plurality of weights comprising a respective float value;

training the ASR model on the plurality of training samples using a quantity of random noise, the quantity of random noise based on the minimum integer fixed-bit width;

after training the ASR model, selecting a target integer fixed-bit width greater than or equal to the minimum integer fixed-bit width;

for each respective weight of the plurality of weights, quantizing the respective weight from the respective float value to a respective integer associated with a value of the selected target integer fixed-bit width; and providing the quantized trained ASR model to a user device.

12. The system of claim 11, wherein the maximum quantization level comprises 4-bit quantization.

13. The system of claim 11, wherein the maximum quantization level comprises 2-bit quantization.

14. The system of claim 11, wherein the random noise is drawn from a uniform distribution of noise.

15. The system of claim 11, wherein training the ASR model using the quantity of random noise comprises, for each respective channel of each respective tensor of the ASR model:

determining a respective maximum value for the respective channel of the respective tensor; and adding, to the respective channel of the respective tensor, a uniform distribution of noise based on the respective maximum value and the minimum integer fixed-bit width.

16. The system of claim 15, wherein the uniform distribution of noise represents the entire range of noise the ASR model receives due to quantization up to the minimum integer fixed-bit width.

17. The system of claim 15, wherein adding the uniform distribution of noise comprises scaling the uniform distribution of noise based on the respective maximum value.

18. The system of claim 17, wherein scaling the uniform distribution of noise is further based on a sensitivity of the respective channel to scaling.

19. The system of claim 11, wherein training the ASR model using the quantity of random noise comprises adding, during forward propagation of the ASR model, the quantity of random noise.

20. The system of claim 11, wherein:

the ASR model further comprises a plurality of activations, each activation of the plurality of activations comprising a respective float value; and for each respective activation of the plurality of activations, the operations further comprise quantizing the respective activation from the respective float value to the respective integer associated with the value of the selected target fixed-bit width.

21. A computer-implemented method when executed on data processing hardware causes the data processing hardware to perform operations comprising:

obtaining a plurality of training samples;

determining a minimum integer fixed-bit width representing a maximum quantization of a model, the model comprising a plurality of weights, each respective weight of the plurality of weights comprising a respective float value;

training the model on the plurality of training samples using a quantity of random noise, the quantity of random noise based on the minimum integer fixed-bit width;

after training the model, selecting a target integer fixed-bit width greater than or equal to the minimum integer fixed-bit width;

for each respective weight of the plurality of weights, quantizing the respective weight from the respective float value to a respective integer associated with a value of the selected target integer fixed-bit width; and providing the quantized trained model to a user device.

22. The method of claim 21, wherein the model comprises an automated speech recognition model.

23. The method of claim 21, wherein the model comprises a large language model.

24. The method of claim 21, wherein the model comprises an image processing model.

\* \* \* \* \*